(12) United States Patent
Chu et al.

(10) Patent No.: US 10,780,390 B2
(45) Date of Patent: Sep. 22, 2020

(54) GAS-PHASE OXIDATION/DECOMPOSITION AND ABSORPTION INTEGRATED DEVICE AND APPLICATION THEREOF

(71) Applicant: BEIJING UNIVERSITY OF CHEMICAL TECHNOLOGY, Beijing (CN)

(72) Inventors: Guangwen Chu, Beijing (CN); Yong Cai, Beijing (CN); Jianfeng Chen, Beijing (CN); Yong Luo, Beijing (CN); Haikui Zou, Beijing (CN); Baochang Sun, Beijing (CN)

(73) Assignee: BEIJING UNIVERSITY OF CHEMICAL TECHNOLOGY, Beijing (CN)

( * ) Notice: Subject to any disclaimer, the term of this patent is extended or adjusted under 35 U.S.C. 154(b) by 0 days.

(21) Appl. No.: 16/606,070

(22) PCT Filed: Apr. 16, 2018

(86) PCT No.: PCT/CN2018/083213
§ 371 (c)(1),
(2) Date: Oct. 17, 2019

(87) PCT Pub. No.: WO2018/192446
PCT Pub. Date: Oct. 25, 2018

(65) Prior Publication Data
US 2020/0038804 A1    Feb. 6, 2020

(30) Foreign Application Priority Data

Apr. 18, 2017   (CN) .......................... 2017 1 0254280

(51) Int. Cl.
*B01D 53/32*   (2006.01)
*B01D 53/78*   (2006.01)
(Continued)

(52) U.S. Cl.
CPC ............. *B01D 53/32* (2013.01); *B01D 53/44* (2013.01); *B01D 53/56* (2013.01); *B01D 53/78* (2013.01); *B01D 2258/0283* (2013.01)

(58) Field of Classification Search
None
See application file for complete search history.

(56) References Cited

FOREIGN PATENT DOCUMENTS

| CN | 102120172 A | * | 7/2011 | ......... B01D 53/8609 |
| CN | 105032136 A | * | 11/2015 | |

OTHER PUBLICATIONS

CN-102120172-A English Translation (Year: 2011).*
CN-105032136-A English Translation (Year: 2015).*

* cited by examiner

*Primary Examiner* — Anita Nassiri-Motlagh
(74) *Attorney, Agent, or Firm* — Paratus Law Group, PLLC

(57) ABSTRACT

Provided are a gas phase oxidation/decomposition and absorption integrated device and application thereof in a gas-liquid system. The device comprises a housing (100), a motor (102), and a boost regulator (103); the housing (100) is internally provided with a rotating chamber (120) and a discharge chamber (122); the rotating chamber (120) comprises a rotating shaft (119), a turntable (124), a liquid distributor (123), packing layers (110), a guiding round table (111), a liquid inlet (108), a liquid outlet (112), and a first gas outlet (109); the discharge chamber (122) is located under the rotating chamber (120) and comprises a discharge chamber housing (121) and a plasma generator.

23 Claims, 2 Drawing Sheets

(51) Int. Cl.
*B01D 53/44* (2006.01)
*B01D 53/56* (2006.01)

GAS-PHASE OXIDATION/DECOMPOSITION AND ABSORPTION INTEGRATED DEVICE AND APPLICATION THEREOF

CROSS REFERENCE TO PRIOR APPLICATION

This application is a National Stage Patent Application of PCT International Patent Application No. PCT/CN2018/083213 (filed on Apr. 16, 2018) under 35 U.S.C. § 371, which claims priority to Chinese Patent Application No. 201710254280.2 (filed on Apr. 18, 2017), which are all hereby incorporated by reference in their entirety.

FIELD OF THE INVENTION

The present invention relates to the technical field of the removal of nitrogen oxides and/or volatile organic compounds. More specifically, the present invention relates to a gas phase oxidation/decomposition and absorption integrated device and application thereof.

BACKGROUND OF THE INVENTION

The harmful substances such as sulfur oxides, nitrogen oxides and dust emitted by thermal power plants cause serious air pollution: the volatile organic compounds in the production process of pharmaceutical and chemical industries are benzodiazepines, diisocyanate (TDI) and diisocyanotoluene esters and also cause serious air pollution, causing serious harm to humans and living environment. At present, air pollution control methods mainly include: electrostatic dust removal, bag dust removal, wet desulfurization, catalytic denitrification and direct combustion methods, etc., but the existing exhaust gas purification devices are mostly single pollutant removal devices, which occupy a large area and involve complicated processes. With the continuous improvement of environmental protection standards, existing environmental protection facilities need to be continuously improved, accompanying with large investment and high operating costs. Therefore, the development of an economical, feasible and effective exhaust gas treatment device and method has important industrial application value.

The plasma is the fourth state of matter in addition to solid state, liquid state, and gaseous state, which is an aggregated-state substance. The high-energy electrons of the plasma would undergo a series of elementary reactions when colliding with gas molecules, and produce a variety of active free radicals, high-energy electrons, ecological oxygen, etc during the reactions. These high-energy electrons, free radicals and other active particles would interact with various pollutants in the gas so as to oxidize and decompose them in a very short time. For example, harmful substances such as NO in the flue gas or benzodiazepines in the volatile organic compounds are oxidized and decomposed into easily-removed $NO_2$ or $CO_2$ without pollution properties. The device technology has the advantages of high chemical reaction rate and high removal efficiency due to occurrence of ionic, atomic and molecular reactions. In the process of realizing the gas-liquid system reaction, the traditional gas-liquid reactor had the disadvantages of low mass transfer efficiency and insufficient reaction conversion rate.

Therefore, it is necessary to develop a device that occupies a small area and can effectively remove various pollutants in industrial waste gas.

SUMMARY OF THE INVENTION

A first objective of the present invention is to provide a gas phase oxidation/decomposition and absorption integrated device.

A second objective of the present invention is to provide application of a gas phase oxidation/decomposition and absorption integrated device in a gas-liquid system.

To achieve the above first objective, the present invention adopts the following technical solutions:

The gas phase oxidation/decomposition and absorption integrated device includes a housing, a motor, and a boost regulator; the housing is internally provided with a rotating chamber and a discharge chamber;

the rotating chamber includes a rotating shaft, a turntable, a liquid distributor, packing layers, a guiding round table, a liquid inlet, a liquid outlet, and a first gas outlet; the liquid inlet, the liquid outlet, and the first gas outlet are all disposed on the housing; the liquid inlet is nested in the first gas outlet, and the lower end of the liquid extends to a hollow cavity in the middle of the packing layers and is connected with the liquid distributor disposed in the hollow cavity of the packing layers; the turntable for fixing the packing layers is connected with the rotating shaft, and the rotating shaft extends to the outside of the housing and is connected with the motor; the guiding round table is located at the bottom of the rotating chamber, and fits over the rotating shaft.

The discharge chamber is located below the rotating chamber; the discharge chamber includes a discharge chamber housing and a plasma generator; the plasma generator is fixedly disposed in the discharge chamber housing and connected with the boost regulator through a high voltage wire; the discharge chamber housing is fixedly disposed on an inner side wall of the housing-; the discharge chamber housing is provided with a gas inlet and a second gas outlet; the gas inlet extends out of the side wall of the housing; and the second gas outlet leads to the rotating chamber.

Preferably, on condition that the number of the packing layers is 2 or more, the rotating chamber further includes liquid guiding plates disposed between adjacent packing layers.

Preferably, the number of the packing layers is 2 to 4.

Preferably, packing of the packing layers is wire mesh packing.

Preferably, the plasma generator includes m levels of high voltage electrodes and m levels of ground electrodes; each level of high voltage electrode and each level of ground electrode are alternately arranged at equal intervals to form a plasma field; one end of each level of high voltage electrode and one end of each level of ground electrode are fixed on the inner wall of the discharge chamber housing; wherein m is a positive integer, greater than or equal to 1, preferably 3 to 5.

Preferably, the gas inlet is located at the bottom of the discharge chamber housing; the second gas outlet is located at the top of the discharge chamber housing.

More preferably, the gas inlet is in communication with the lowermost level of them levels of high voltage electrodes; the second gas outlet is located above the uppermost level of the m levels of high voltage electrodes.

Preferably, the discharge chamber housing is made of glass steel; the discharge chamber housing includes a side wall, an upper end cover and a lower end cover, and the side wall, the upper end cover and the lower end cover constitute a closed cavity; the thickness of the side wall is 8 mm, the thickness of the upper end cover is 10 mm, and the thickness of the lower end cover is 10 mm.

Preferably, the high voltage electrodes and the ground electrodes are made of stainless steel with a thickness of 3 mm to 10 mm. For the high voltage electrodes, the distance between every two adjacent high voltage electrodes is 10-30 mm; preferably, the high voltage electrodes are needle type high voltage electrodes, and a discharge tip of each needle type high voltage electrode has a needle length of 5-8 mm.

To achieve the above second objective, the present invention provides an application of the gas phase oxidation/decomposition and absorption integrated device as described above in a gas-liquid system.

Preferably, the application is use of the integrated device for the removal of nitrogen oxides and/or volatile organic compounds from industrial waste gas.

Preferably, the industrial waste gas includes thermal power plant exhaust gas, kiln flue gas, and marine diesel exhaust gas.

Preferably, the application includes the following steps:

1) energizing the plasma generator to form a plasma field, and then feeding a gas phase mixture into the discharge chamber from the gas inlet so that the gas phase mixture is subjected to multi-stage oxidation and decomposition through the plasma field; wherein the plasma generator has an alternating voltage of 0-60 kV, preferably 20-55 kV, more preferably 40-50 kV; the operating alternating voltage frequency is 0-350 Hz, preferably 100-300 Hz, more preferably 250-300 Hz;

2) allowing the gas phase mixture passing through the plasma field to enter the rotating chamber from the second gas outlet; allowing a liquid phase to enter the rotating chamber from the liquid inlet to cause a gas-liquid countercurrent contact under the action of a centrifugal force, wherein the rotation speed of the rotating shaft is 0-2800 rpm, preferably 500-2000 rpm, more preferably 1000-1500 rpm; and 3) after the gas-liquid countercurrent contact is completed, discharging the gas phase mixture from the first gas outlet, and discharging the liquid phase from the liquid outlet.

The beneficial effects of the present invention are as follows:

The present invention provides a gas phase oxidation/decomposition and absorption integrated device. On the basis of the combination of a plasma technology and a supergravity technology, plasma is used to oxidize and decompose harmful substances such as NO in flue gas or benzodiazepines in volatile organic compounds into easily removed $NO_2$ or $CO_2$ without pollution properties, etc.; by virtue of the supergravity technology, the mass transfer between gas and liquid is enhanced, and the waste gas removal rate is improved, thereby achieving the removal of nitrogen oxides in the flue gas and the treatment of volatile organic compounds and achieving important environmental, economic and social benefits.

BRIEF DESCRIPTION OF THE DRAWINGS

Specific embodiments of the present invention will be described in further detail with reference to the accompanying drawings.

DETAILED DESCRIPTION OF THE PREFERRED EMBODIMENTS

Figure 1:
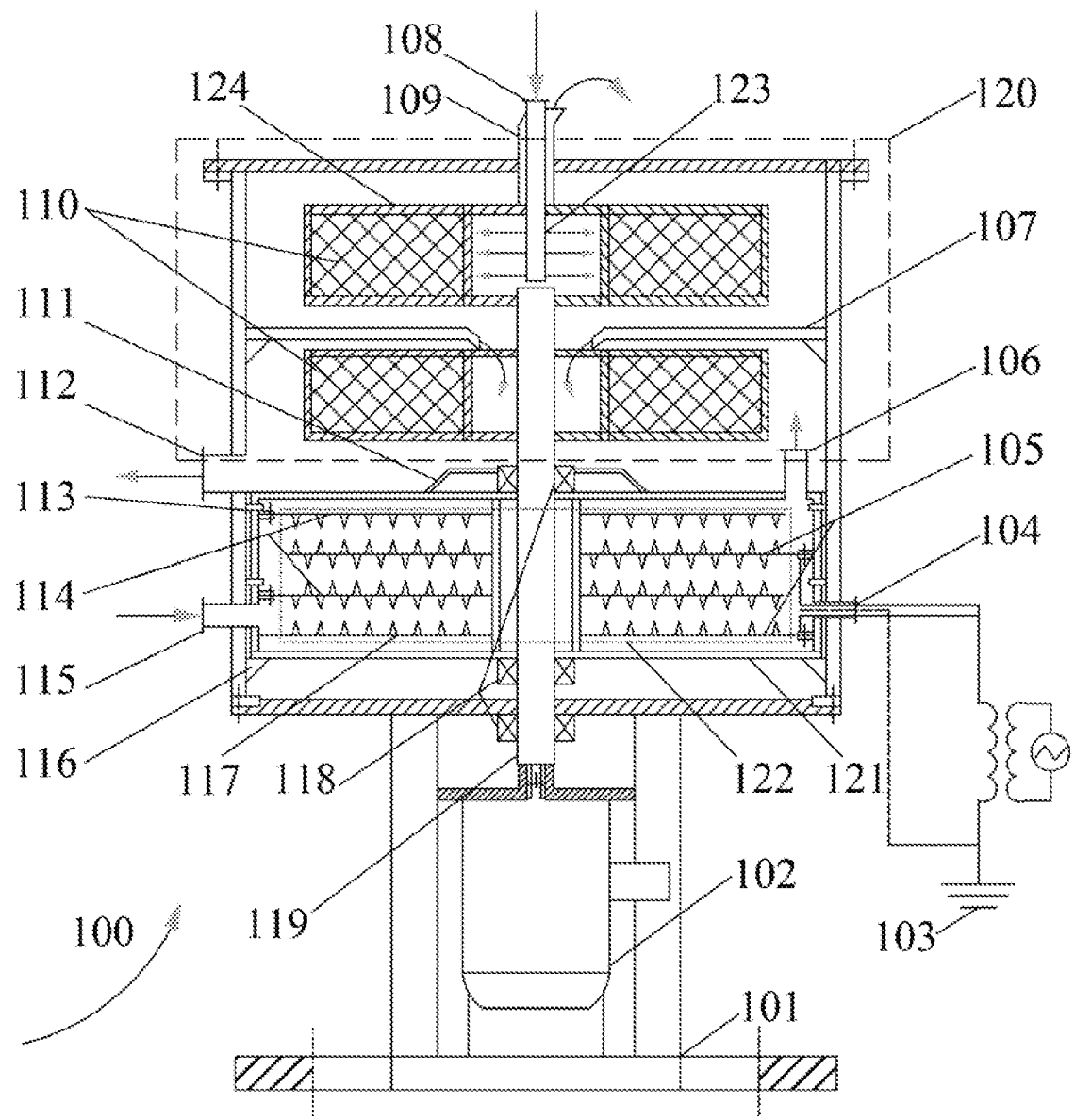
FIG. 1 is a structural schematic diagram of an integrated device according to Embodiment 1 of the present invention.

To explain the present invention more clearly, the present invention will be further described in conjunction with the preferred embodiments and the accompanying drawings. Similar components in the drawings are denoted by the same reference numerals. It should be understood by those skilled in the art that the following detailed description is intended to be illustrative but not restrictive and the scope of the present invention should not be limited thereto.

FIG. 1 is a schematic diagram of an integrated device according to Embodiment 1 described below; in combination with FIG. 1, the gas phase oxidation/decomposition and absorption integrated device of the present invention includes a housing 100, a motor 102, and a boost regulator 103; the housing 100 is internally provided with a rotating chamber 120 and a discharge chamber 122.

The rotating chamber 120 includes a rotating shaft 119, a turntable 124, a liquid distributor 123, packing layers 110, a guiding round table 111, a liquid inlet 108, a liquid outlet 112, and a first gas outlet 109. The liquid inlet 108, the liquid outlet 112 and the first gas outlet 109 are all disposed on the housing 100: a liquid inlet 108 is nested in the first gas outlet 109, and the lower end of the liquid inlet 108 extends to a hollow cavity in the middle of the packing layers 110 and is connected with the liquid distributor 123 disposed in the hollow cavity of the packing layers 110: the turntable 124 for fixing the packing layers 110 is connected with the rotating shaft 119, and the rotating shaft 119 extends to the outside of the housing 100 and is connected with the motor 102: and the guiding round table 111 is located at the bottom of the rotating chamber 120 and fits over the rotating shaft 119.

The discharge chamber 122 is located below the rotating chamber 120. The discharge chamber 122 includes a discharge chamber housing 121 and a plasma generator: the plasma generator is fixedly disposed in the discharge chamber housing 121 and connected with the boost regulator 103 through a high voltage wire, the discharge chamber housing 121 is fixedly disposed on an inner side wall of the housing 100, for example, by bolts, screws or riveting; the discharge chamber housing 121 is provided with a gas inlet 115 and a second gas outlet 106; the gas inlet 115 extends out of the side wall of the housing 100; and the second gas outlet 106 leads to the rotating chamber 120.

To improve the gas-liquid mass transfer effect in the rotating chamber 120, and improve the absorption and mass transfer efficiency of the packing layers 110 to a liquid phase entering from the liquid inlet 108, one packing layer or multiple packing layers 110 may be set in the present invention according to actual needs. The multiple packing layers means two or more packing layers. On condition that there are multiple packing layers 110, the packing layers 110 may be disposed layer by layer from top to bottom, progressively reducing the microscopic size of the liquid phase, thereby improving gas-liquid mass transfer efficiency. In some embodiments, on condition that the number of the packing layers 110 is more than 2, the rotating chamber 120 further includes liquid guiding plates 107 disposed between adjacent upper and lower packing layers 110, and each liquid guiding plate is used for guiding liquid coming out of a packing layer 110 above the liquid guiding plate 107 into a hollow portion in a packing layer 110 below the liquid guiding plate 107. In still other more specific embodiments, each liquid guide plate 107 is fixed, at one end, to a reinforcing rib on the inner side wall of the housing 100 and extends, at the other end, over the hollow portion of a packing layer 110 below the liquid guide plate 107. In some more preferred embodiments, the number of the packing layers 110 is 2-4, and in this case, the mass transfer efficiency and reaction conversion rate are improved, the liquid phase can be dispersed into smaller and more uniform particles, the absorption area of the packing layers to the liquid phase can be increased, the size of the housing 100 can also be well controlled to a small extent. The packing in the packing layers 110 may be wire mesh packing.

In the integrated device of the present invention, the discharge chamber housing 121 fits over the rotating shaft 119 by a dynamic seal 118.

In the present invention, in order to discharge the liquid phase dispersed by the packing layers 10 more timely and completely, the liquid outlet 112 is disposed on the side wall of the housing 100 and at the bottom of the rotating chamber 120, and a guiding round table 111 is disposed at the bottom of the rotating chamber 120 and used for rapidly guiding the liquid phase dispersed by the packing layers 110 to the liquid outlet 112. In some specific embodiments, the guiding round table 111 fits over the rotating shaft 119 by the dynamic seal 118.

The plasma generator of the present invention is capable of forming at least one level of plasma field. In some specific embodiments, the plasma generator includes m levels of high voltage electrodes 114 and m levels of ground electrodes 105; each level of high voltage electrode 114 and each level of ground electrode 105 are alternately arranged at equal intervals to form multi-level plasma fields, wherein m is a positive integer, greater than or equal to 1. In some preferred embodiments, m is 3-5, i.e., multiple levels of plasma fields are correspondingly formed, and in this case, the gas entering from the gas inlet 115 can be oxidized and decomposed in a short time. In some more specific embodiments, one end of each level of high voltage electrode 114 and one end of each level of ground electrode 105 are fixed on the inner wall of the discharge chamber housing 121 at equal intervals. For example, the m levels of high-voltage electrodes 114 and the m levels of ground electrodes 105 are fixed on an annular metal spacer 113 on the inner wall of the discharge chamber housing 121 by bolts, and the fixing manner here may be, for example, bolted connection. The m levels of high-voltage electrodes 114 and the m levels of ground electrodes 105 of the plasma generator are respectively bolted to the high voltage wire, and the high voltage wire passes through a high voltage wire hole 104 in the discharge chamber housing 121 and passes through the housing 100 to be connected with the boost regulator 103.

In some specific embodiments of the present invention, the gas inlet 115 is located at the bottom of the discharge chamber housing 121: and the second gas outlet 106 is located at the top of the discharge chamber housing 121. More preferably, the gas inlet 115 is in communication with the lowermost level of the m levels of high voltage electrodes 114: the second gas outlet 106 is located above the uppermost level of the m levels of high voltage electrodes 114. The discharge chamber housing 121 includes a side wall, an upper end cover and a lower end cover, and the side wall, the upper end cover and the lower end cover constitute a closed cavity; and the thickness of the side wall is 8 mm, the thickness of the upper end cover is 10 mm, and the thickness of the lower end cover is 10 mm. The housing 121 may be made of glass steel. The glass steel housing 121 functions as an insulator on one hand and also achieves a gas impact resistance on the other hand. Therefore, the structure becomes more stable.

In some specific embodiments of the present invention, the high voltage electrodes 114 and the ground electrodes 105 are made of stainless steel and have a thickness of 3 mm to 10 mm. For the high voltage electrodes 114, the distance between every two adjacent high voltage electrodes 114 may be, for example, 10-30 mm, and when the distance is controlled within this range, a strong plasma field can be formed, and the required space can be minimized. In this case, the gas phase passes through the plasma field in the form of baffling (i.e. the gas phase does not travel in a straight line), which enables the gas phase to be more fully and efficiently oxidized and decomposed. Preferably, the high voltage electrodes 114 are needle type high voltage electrodes, and the needle length of the discharge tip of each needle type high voltage electrode is controlled to be 5-8 mm.

In practical applications, a person skilled in the art can provide a base 101 for fixing the housing 100 and the motor 102 as needed.

The working principle of the gas phase oxidation/decomposition and absorption integrated device in the present invention is that the gas phase enters the discharge chamber 122 through the gas inlet 115; after being subjected to the multi-stage oxidation and decomposition through the plasma field formed by the plasma generator, the gas enters the rotating chamber 120 through the second gas outlet 106; the gas comes into contact with a liquid phase absorbent which enters into the packing layers 110 of the rotating chamber 120 through the liquid inlet 108 and then is homogenized by supergravity rotation, so that nitrogen oxides and/or volatile organic compounds in the gas are sufficiently absorbed; finally, the purified gas is discharged from the first gas outlet 109, and the liquid is discharged from the liquid outlet 112. Thus, the purification of gas is realized.

According to the present invention, since the discharge chamber 122 is disposed in the housing 100, plasma field is used, on one hand, to oxidize and decompose harmful substances such as NO in flue gas and/or volatile organic compounds into easily removed $NO_2$ or $CO_2$ without pollution properties, etc.; by virtue of the supergravity technology, the mass transfer between gas and liquid is enhanced, and the waste gas removal rate is improved, thereby achieving the removal of nitrogen oxides in the flue gas and the treatment of volatile organic compounds and achieving important environmental, economic and social benefits. In addition, compared with the prior art in which the discharge chamber and the rotating chamber are coupled, the present invention where the discharge chamber and the rotating chamber are integrated has the advantage that the oxidation degree/decomposition degree can be better regulated; and the absorption rate can be adjusted by arrangement of multiple packing layers The gas phase oxidation/decomposition and absorption integrated device of the present invention has a small size and can be easily carried and used in many harsh environments. Thus, the device can be used in a gas-liquid system. Further, the integrated device can be used for the removal of nitrogen oxides and/or volatile organic compounds from industrial waste gas. The industrial waste gas includes thermal power plant exhaust gas, kiln flue gas, and marine diesel exhaust gas. In some specific embodiments, the application includes the following steps:

1) energizing a plasma generator to form a plasma field, and then feeding a gas phase mixture into the discharge chamber 122 from the gas inlet 115 so that the gas phase mixture is subjected to multi-stage oxidation and decomposition through the plasma field; wherein the plasma generator has an alternating voltage of 0-60 kV, preferably 20-55 kV, more preferably 40-50 kV; the operating alternating voltage frequency is 0-350 Hz, preferably 100-300 Hz, more preferably 250-300 Hz;

2) allowing the gas phase mixture passing through the plasma field to enter the rotating chamber 120 from the second gas outlet 106; allowing a liquid phase to enter the rotating chamber 120 from the liquid inlet 108 to cause a gas-liquid countercurrent contact under the action of a centrifugal force, wherein the rotation speed of the rotating shaft 119 is 0-2800 rpm, preferably 500-2000 rpm, more preferably 1000-1500 rpm; and 3) after the gas-liquid countercurrent contact is completed, discharging the gas phase mixture from the first gas outlet 109, and discharging the liquid phase from the liquid outlet 112.

The liquid phase here may be an alkaline solution such as urea or sodium hydroxide to facilitate better absorption of gas-phase nitrogen oxides and/or volatile organic compounds entering the rotating chamber.

Hereinafter, the technical solutions of the present invention will be described by using specific embodiments:

Embodiment 1

Disclosed is a gas phase oxidation/decomposition and absorption integrated device, including a housing 100, a motor 102, and a boost regulator 103. The housing 100 is internally provided with a rotating chamber 120 and a discharge chamber 122.

The rotating chamber 120 includes a rotating shaft 119, a turntable 124, a liquid distributor 123, packing layers 110, a guiding round table 111, a liquid inlet 108, a liquid outlet 112, and a first gas outlet 109. The liquid inlet 108, the liquid outlet 112, and the first gas outlet 109 are all disposed on the housing 110; a liquid inlet 108 is nested in the first gas outlet 109, and the lower end of the liquid inlet 108 extends to a hollow cavity in the middle of the packing layers 110 and is connected with the liquid distributor 123 disposed in the hollow cavity of the packing layers 110; the turntable 124 for fixing the packing layers 110 is connected with the rotating shaft 119, and the rotating shaft 119 extends to the outside of the housing 100 and is connected with the motor 102; and the guiding round table 111 is located at the bottom of the rotating chamber 120 and fits over the rotating shaft 119.

The discharge chamber 122 is located below the rotating chamber 120. The discharge chamber 122 includes a discharge chamber housing 121 and a plasma generator; the plasma generator is fixedly disposed in the discharge chamber housing 121 and connected with the boost regulator 103 through a high voltage wire; the discharge chamber housing 121 is fixedly disposed on a side wall of the housing 100; the discharge chamber housing 121 is provided with a gas inlet 115 and a second gas outlet 106; the gas inlet 115 extends out of the side wall of the housing 100; and the second gas outlet 106 leads to the rotating chamber 120.

The number of the packing layers 110 is 2. The rotating chamber 120 further includes liquid guiding plates 107 disposed between adjacent upper and lower packing layers 110, and each liquid guiding plate 107 is used for guiding liquid coming out of a packing layer 110 above the liquid guiding plate 107 to a hollow portion in a packing layer 110 below the liquid guiding plate 107. Each liquid guide plate 107 is fixed, at one end, to a reinforcing rib on the inner side wall of the housing 100 and extends, at the other end, over the hollow portion of a packing layer 110 below the liquid guide plate 107.

In this device, the discharge chamber housing 121 fits over the rotating shaft 119 by a dynamic seal. The liquid outlet 112 is disposed on the side wall of the housing 100 and at the bottom of the rotating chamber 120, and a guiding round table 111 is disposed at the bottom of the rotating chamber 120 and used for rapidly guiding the liquid phase dispersed by the packing layers 110 to the liquid outlet 112. The guiding round table 111 fits over the rotating shaft 119 by the dynamic seal 118.

Moreover, the plasma generator includes two levels of high voltage electrodes 114 and two levels of ground electrodes 105; each level of high voltage electrode 114 and each level of ground electrode 105 are alternately arranged at equal intervals to form three levels of plasma fields; one end of each level of high voltage electrode 114 and one end of each level of ground electrode 105 are fixed at equal intervals on an annular metal spacer 113 on the inner wall of the discharge chamber housing 121 by bolts. The two levels of high-voltage electrodes 114 and the two levels of ground electrodes 105 of the plasma generator are respectively bolted to the high voltage wire, and the high voltage wire passes through a high voltage wire hole 104 in the discharge chamber housing 121 and passes through the housing 100 to be connected with the boost regulator 103. The high voltage electrodes 114 and the ground electrodes 105 are made of stainless steel and have a thickness of 3 mm to 10 mm. The high voltage electrodes 114 are needle type high voltage electrodes, the spacing between every two adjacent high voltage electrodes 114 is 10-30 mm, and the needle length of the discharge tip of each needle type high voltage electrode is controlled to be 5-8 mm.

The gas inlet 115 is in communication with the lowermost level of high voltage electrode 114; and the second gas outlet 106 is located above the uppermost level of high voltage electrode 114. The discharge chamber housing 121 includes a side wall, an upper end cover and a lower end cover, and the side wall, the upper end cover and the lower end cover constitute a closed cavity: and the thickness of the side wall is 8 mm, the thickness of the upper end cover is 10 mm, and the thickness of the lower end cover is 10 mm. The housing 121 may be made of glass steel.

The integrated device is also provided with a base 101 for fixing the housing 100 and the motor 102.

Embodiment 2

Figure 2:
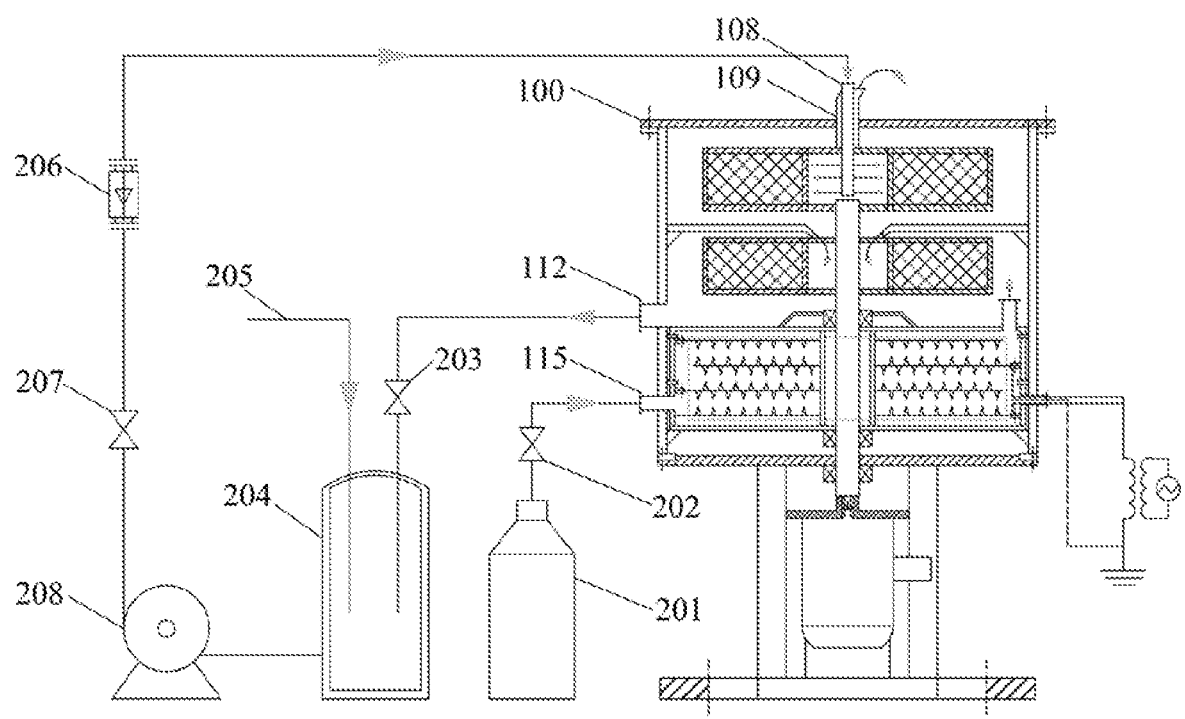
FIG. 2 is a process flowchart of an application of an integrated device in a gas-liquid system according to Embodiment 2 of the present invention.

As shown in FIG. 1 and FIG. 2 is a method for deep removal of nitrogen oxides by the gas phase oxidation/decomposition and absorption integrated device.

The mixed gas flows out of a NO mixed gas tank 201 provided with a regulating valve 202 at the upper part of the gas tank, then enters the discharge chamber 122 through the gas inlet 115, and the baffling gas passes through three levels of plasma fields. At the same time, an alkaline solution (urea or sodium hydroxide) stored in an alkaline solution tank 204 is conveyed into the rotating chamber 120 from the liquid inlet 108 by a pump 208 via a ball valve 207 and a mass flow meter 206, wherein the mass flow meter 206 records the flow of the alkaline solution. The alkaline solution entering the rotating chamber of a supergravity rotating bed reactor unit is in countercurrent contact with nitrogen oxides, and the resulting salts and the alkaline solution return the alkaline solution tank 204 through the liquid outlet 112, and the alkaline solution is supplemented by a lateral alkali feeding pipe 205, thus forming an alkaline solution circulation loop.

Embodiment 3

As shown in FIG. 1 and FIG. 2 is a method for treating volatile organic compounds by the gas phase oxidation/decomposition and absorption integrated device.

A mixed gas of volatile organic compounds (including benzodiazepines, TDIs and diisocyanotoluene esters) flows out of the mixed gas tank 201 provided with a regulating valve 202 at the upper part, then enters the discharge chamber 122 through the gas inlet 115, and the baffling gas passes through three levels of plasma fields. At the same time, an alkaline solution (sodium hydroxide, etc.) stored in an alkaline solution tank 204 is conveyed into the rotating chamber 120 from the liquid inlet 108 by a pump 208 via a ball valve 207 and a mass flow meter 206, wherein the mass flow meter 206 records the flow of the alkaline solution. The alkaline solution entering the rotating chamber 120 of a supergravity rotating bed reactor unit is in countercurrent contact with nitrogen oxides, and the resulting salts and the alkaline solution return the alkaline solution tank 204 through the liquid outlet 112, and the alkaline solution is supplemented by a lateral alkali feeding pipe 205, thus forming an alkaline solution circulation loop.

Embodiment 4

The process described in Embodiment 2 is adopted to deeply remove nitrogen oxides from flue gas.

The alkaline solution is a urea solution having a mass fraction of 2-10%. By controlling the operation condition as a gas phase flow rate of 2 m$^3$/h, a liquid phase flow rate of 40 L/h, an inlet NOx concentration of 1000 mg/m3, and a rotation speed of 1500 rpm, an alternating current voltage of 50 kV and an operating voltage frequency of 300 Hz, the final concentration of NO at the first gas outlet is less than 100 mg/m$^3$.

Embodiment 5

The treatment of a gas mixture with the volatile organic compound benzene is the same as that in Embodiment 4 except that:

The mixed gas is a benzene-containing volatile organic gas, and the alkaline solution is a sodium hydroxide solution having a mass fraction of 2-10%, and the final concentration of benzene at the first gas outlet is less than 75 mg/m$^3$.

It can be seen from the above embodiments that the plasma fields are combined in the supergravity rotating bed reactor, and thus the advantages of the plasma technology and the supergravity technology are combined. The present invention strengthens the oxidation, decomposition and absorption process of the waste gas components, thereby realizing the deep removal of nitrogen oxides and the treatment of the pollution components in the volatile organic compounds.

It is apparent that the above-described embodiments of the present invention are merely illustrative of the present invention and are not intended to limit the embodiments of the present invention. Various other variations or modifications may be made by those skilled in the art based on the above description. All embodiments may not be exhaustive here, and obvious variations or modifications that are derived from the technical solutions of the present invention are still within the scope of the present invention.

The invention claimed is:

1. A gas phase oxidation/decomposition and absorption integrated device, comprising a housing (100), a motor (102), and a boost regulator (103), wherein the housing (100) is internally provided with a rotating chamber (120) and a discharge chamber (122);

the rotating chamber (120) comprises a rotating shaft (119), a turntable (124), a liquid distributor (123), packing layers (110), a guiding round table (111), a liquid inlet (108), a liquid outlet (112), and a first gas outlet (109); the liquid inlet (108), the liquid outlet (112), and the first gas outlet (109) are all disposed on the housing (100); a liquid inlet (108) is nested in the first gas outlet (109), and the lower end of the liquid inlet (108) extends to a hollow cavity in the middle of the packing layers (110) and is connected with the liquid distributor (123) disposed in the hollow cavity of the packing layers (110); the turntable (124) for fixing the packing layers (110) is connected with the rotating shaft (119), and the rotating shaft (119) extends to the outside of the housing (100) and is connected with the motor (102); the guiding round table (111) is located at the bottom of the rotating chamber (120) and fits over the rotating shaft (119);

the discharge chamber (122) is located below the rotating chamber (120); the discharge chamber (122) includes a discharge chamber housing (121) and a plasma generator; the plasma generator is fixedly disposed in the discharge chamber housing (121) and connected with the boost regulator (103) through a high voltage wire; the discharge chamber housing (121) is fixedly disposed on an inner side wall of the housing (100); the discharge chamber housing (121) is provided with a gas inlet (115) and a second gas outlet (106); the gas inlet (115) extends out of the side wall of the housing (100); and the second gas outlet (106) leads to the rotating chamber (120).

2. The integrated device according to claim 1, wherein when the number of the packing layers (110) is 2 or more, the rotating chamber (120) further comprises liquid guiding plates (107) disposed between adjacent packing layers (110).

3. The integrated device according to claim 1, wherein the plasma generator comprises m levels of high voltage electrodes (114) and m levels of ground electrodes (105), each level of high voltage electrode (114) and each level of ground electrode (105) are alternately arranged at equal intervals to form a plasma field, one end of each level of high voltage electrode (114) and one end of each level of ground electrode (105) are fixed on an inner wall of the discharge chamber housing (121), wherein m is a positive integer, greater than or equal to 1.

4. The integrated device according to claim 3, wherein the gas inlet (115) is located at the bottom of the discharge chamber housing (121), and the second gas outlet (106) is located at the top of the discharge chamber housing (121).

5. The integrated device according to claim 1, wherein the discharge chamber housing (121) is made of glass steel; the discharge chamber housing (121) comprises a side wall, an upper end cover and a lower end cover, and the side wall, the upper end cover and the lower end cover constitute a closed cavity; and the thickness of the side wall is 8 mm, the thickness of the upper end cover is 10 mm, and the thickness of the lower end cover is 10 mm.

6. The integrated device according to claim 3, wherein the high voltage electrodes (114) and the ground electrodes (105) are made of stainless steel with a thickness of 3 mm to 10 mm; for the high voltage electrodes (114), the distance between every two adjacent high voltage electrodes 114 is 10-30 mm.

7. Application of the integrated device according to claim 1 in a gas-liquid system, comprising the following steps:
   1) energizing a plasma generator to form a plasma field, and then feeding a gas phase mixture into the discharge chamber (122) from the gas inlet (115) so that the gas phase mixture is subjected to multi-stage oxidation and decomposition through the plasma field, wherein the plasma generator has an alternating voltage of 0-60 kV, and the operating alternating voltage frequency is 0-350 Hz;
   2) allowing the gas phase mixture passing through the plasma field to enter the rotating chamber (120) from the second gas outlet (106); and allowing a liquid phase to enter the rotating chamber (120) from the liquid inlet (108) to cause a gas-liquid countercurrent contact under the action of a centrifugal force, wherein the rotation speed of the rotating shaft (119) is 0-2800 rpm; and
   3) after the gas-liquid countercurrent contact is completed, discharging the gas phase mixture from the first gas outlet (109), and discharging the liquid phase from the liquid outlet (112).

8. The application according to claim 7, wherein the application is use of the integrated device for the removal of nitrogen oxides and/or volatile organic compounds from industrial waste gas.

9. The application according to claim 8, wherein the industrial waste gas includes thermal power plant exhaust gas, kiln flue gas, and marine diesel exhaust gas.

10. Application of the integrated device according to claim 2 in a gas-liquid system, comprising the following steps:
   1) energizing a plasma generator to form a plasma field, and then feeding a gas phase mixture into the discharge chamber (122) from the gas inlet (115) so that the gas phase mixture is subjected to multi-stage oxidation and decomposition through the plasma field, wherein the plasma generator has an alternating voltage of 0-60 kV, and the operating alternating voltage frequency is 0-350 Hz;
   2) allowing the gas phase mixture passing through the plasma field to enter the rotating chamber (120) from the second gas outlet (106); and allowing a liquid phase to enter the rotating chamber (120) from the liquid inlet (108) to cause a gas-liquid countercurrent contact under the action of a centrifugal force, wherein the rotation speed of the rotating shaft (119) is 0-2800 rpm; and
   3) after the gas-liquid countercurrent contact is completed, discharging the gas phase mixture from the first gas outlet (109), and discharging the liquid phase from the liquid outlet (112).

11. Application of the integrated device according to claim 3 in a gas-liquid system, comprising the following steps:
   1) energizing a plasma generator to form a plasma field, and then feeding a gas phase mixture into the discharge chamber (122) from the gas inlet (115) so that the gas phase mixture is subjected to multi-stage oxidation and decomposition through the plasma field, wherein the plasma generator has an alternating voltage of 0-60 kV, and the operating alternating voltage frequency is 0-350 Hz;
   2) allowing the gas phase mixture passing through the plasma field to enter the rotating chamber (120) from the second gas outlet (106); and allowing a liquid phase to enter the rotating chamber (120) from the liquid inlet (108) to cause a gas-liquid countercurrent contact under the action of a centrifugal force, wherein the rotation speed of the rotating shaft (119) is 0-2800 rpm; and
   3) after the gas-liquid countercurrent contact is completed, discharging the gas phase mixture from the first gas outlet (109), and discharging the liquid phase from the liquid outlet (112).

12. Application of the integrated device according to claim 4 in a gas-liquid system, comprising the following steps:
   1) energizing a plasma generator to form a plasma field, and then feeding a gas phase mixture into the discharge chamber (122) from the gas inlet (115) so that the gas phase mixture is subjected to multi-stage oxidation and decomposition through the plasma field, wherein the plasma generator has an alternating voltage of 0-60 kV, and the operating alternating voltage frequency is 0-350 Hz;
   2) allowing the gas phase mixture passing through the plasma field to enter the rotating chamber (120) from the second gas outlet (106); and allowing a liquid phase to enter the rotating chamber (120) from the liquid inlet (108) to cause a gas-liquid countercurrent contact under the action of a centrifugal force, wherein the rotation speed of the rotating shaft (119) is 0-2800 rpm; and
   3) after the gas-liquid countercurrent contact is completed, discharging the gas phase mixture from the first gas outlet (109), and discharging the liquid phase from the liquid outlet (112).

13. Application of the integrated device according to claim 5 in a gas-liquid system, comprising the following steps:
   1) energizing a plasma generator to form a plasma field, and then feeding a gas phase mixture into the discharge chamber (122) from the gas inlet (115) so that the gas phase mixture is subjected to multi-stage oxidation and decomposition through the plasma field, wherein the plasma generator has an alternating voltage of 0-60 kV, and the operating alternating voltage frequency is 0-350 Hz;
   2) allowing the gas phase mixture passing through the plasma field to enter the rotating chamber (120) from the second gas outlet (106); and allowing a liquid phase to enter the rotating chamber (120) from the liquid inlet (108) to cause a gas-liquid countercurrent contact under the action of a centrifugal force, wherein the rotation speed of the rotating shaft (119) is 0-2800 rpm; and
   3) after the gas-liquid countercurrent contact is completed, discharging the gas phase mixture from the first gas outlet (109), and discharging the liquid phase from the liquid outlet (112).

14. Application of the integrated device according to claim 6 in a gas-liquid system, comprising the following steps:
   1) energizing a plasma generator to form a plasma field, and then feeding a gas phase mixture into the discharge chamber (122) from the gas inlet (115) so that the gas phase mixture is subjected to multi-stage oxidation and decomposition through the plasma field, wherein the plasma generator has an alternating voltage of 0-60 kV, and the operating alternating voltage frequency is 0-350 Hz;
   2) allowing the gas phase mixture passing through the plasma field to enter the rotating chamber (120) from the second gas outlet (106); and allowing a liquid phase to enter the rotating chamber (120) from the liquid inlet (108) to cause a gas-liquid countercurrent contact under the action of a centrifugal force, wherein the rotation speed of the rotating shaft (119) is 0-2800 rpm; and 3) after the gas-liquid countercurrent contact is completed, discharging the gas phase mixture from the first gas outlet (109), and discharging the liquid phase from the liquid outlet (112).

15. The integrated device according to claim 2, wherein the number of the packing layers (110) is 2-4.

16. The integrated device according to claim 3, wherein m is 3-5.

17. The integrated device according to claim 6, wherein the high voltage electrodes (114) are needle type high voltage electrodes, and a discharge tip of each needle type high voltage electrode has a needle length of 5-8 mm.

18. The application according to claim 7, wherein the plasma generator has an alternating voltage of 20-55 kV.

19. The application according to claim 18, wherein the plasma generator has an alternating voltage of 40-50 kV.

20. The application according to claim 7, wherein the operating alternating voltage frequency is 100-300 Hz.

21. The application according to claim 20, wherein the operating alternating voltage frequency is 250-300 Hz.

22. The application according to claim 7, wherein the rotation speed of the rotating shaft (119) is 500-2000 rpm.

23. The application according to claim 22, wherein the rotation speed of the rotating shaft (119) is 1000-1500 rpm.

\* \* \* \* \*